Patented Nov. 25, 1924.

1,516,629

UNITED STATES PATENT OFFICE.

ERNEST BLAKER, OF AKRON, OHIO, ASSIGNOR TO THE B. F. GOODRICH COMPANY, OF NEW YORK, N. Y., A CORPORATION OF NEW YORK.

METHOD OF VULCANIZING RUBBER COMPOSITION.

No Drawing.   Application filed March 1, 1922. Serial No. 540,310.

*To all whom it may concern:*

Be it known that I, ERNEST BLAKER, a citizen of the United States, residing at Akron, in the county of Summit and State of Ohio, have invented a certain new and useful Method of Vulcanizing Rubber Compositions, of which the following is a specification.

This invention relates to the art of vulcanizing relatively thick rubber bodies, such, for example, as solid or pneumatic tires. It is well known that rubber, balata and similar substances offer a high resistance to the progress of heat from a heating medium surrounding a body of the substance to the center of the latter, with the result that the inner and outer regions of the body frequently are unequally vulcanized.

The principal objects of the present invention are to provide a method adapted to produce a substantially uniform vulcanization throughout an article, to reduce the required time of heating the same, and to improve the physical properties of the vulcanized article.

In the practice of my invention I procure a rapid flow of heat from the outer to the inner regions of the article by applying heat to the exterior thereof at a temperature substantially above the normal vulcanizing temperature. I maintain such relatively high temperature in the outer regions of the article until the flow of heat therefrom has raised the temperature of the inner regions substantially to or above normal vulcanizing temperature, and then lower the temperature of the heating medium substantially to or below normal vulcanizing temperature, to lessen the rate of vulcanization in the outer regions of the article while the residual heat of the inner regions continues to vulcanize the latter at such rate that vulcanization of the inner and outer regions of the article is substantially equalized.

The temperature of the outer regions, after reaching its maximum, may be reduced in a succession of steps, either by rapid or slow changes, or it may be reduced by a continual change of uniform or non-uniform rate, it being essential only that there be a substantial temperature gradient from the outer to the inner regions of the article during the early part of the operation and a substantial temperature gradient in the reverse direction in a subsequent period sufficient substantially to equalize vulcanization throughout the article.

The temperature changes of the heating medium necessary to produce this result are determined in part by the quantities of uncombined sulphur remaining in the different regions of the article during the inward and the outward flow of heat respectively, upon the presence or absence of an accelerator, and the effectiveness thereof at different stages if present, and to some extent upon the heat-conductivity of the compound at different stages of vulcanization, although it is my experience that the latter does not greatly vary. It may depend also upon the endothermal or exothermal character of the reaction within the compound.

By way of example, I may give the following statement of procedure which I have found highly satisfactory in the vulcanizing of pneumatic cord tires:

A tire is built up in the usual manner of rubberized cord fabric, the rubber compound therein containing such percentage of sulphur, with a suitable quantity and character of accelerator, as to produce complete vulcanization under a method heretofore used in which the mold containing the tire was subjected to steam at a temperature of 292° F. for a period of 1 hour and 40 minutes while water at an initial temperature of from 150° to 170° F. was applied to a water bag within the tire, the tire then being removed from the mold and hung in open steam of which the temperature was raised to 292° F. in a period of 10 minutes and held at said temperature for a further period of from 15 to 25 minutes.

In this example of my method tires of the character just described are placed in molds, which are loaded into a vulcanizer, and there subjected to the heating action of steam at a temperature of approximately 300° F. for a period of 60 to 70 minutes, the longer period being used in the case of the larger sized tires.

At the end of said period the temperature of the steam is reduced to approximately 292° F., and so held for a period of 30 to 40 minutes, the longer period being used in the case of the larger tires.

At the end of this second period, I prefer to quickly cool the molds to 212° F. or less, as by spraying them with water for a period of 4 or 5 minutes, during which time the vulcanizer may be opened to the atmosphere. During this cooling of the molds the inner regions of the tires are cooled much less rapidly than their outer regions and continue longer to be vulcanized. At the end of the cooling period the molds are opened and the tires removed therefrom.

In connection with the procedure just described, I have obtained good results by injecting a heating fluid such as super-heated water at an initial temperature of from 300 to 310° F. into rubber water-bags within the tires, at the time the steam at 300° F. is applied to the exterior of the molds, and allowing the temperature of said water to drop gradually, thus applying to the inner surface of the tire a temperature schedule similar to that which is applied to the outer surface, the purpose being in both instances to produce a sharp temperature gradient and consequently a rapid flow of heat from the surface to the inner regions of the vulcanizable body at the beginning of the vulcanizing operation, and a reverse flow of the heat at a later stage, whereby total vulcanization of the inner and outer regions of the article is substantially equalized.

By the method above described complete vulcanization of a body composed of a given compound is produced in much less time than is required with methods heretofore used, and substantially uniform vulcanization of the different parts of the article is produced.

It will be understood that the example given applies to cord tires of certain characteristics, and that the time periods mentioned in said example are longer than are required for other types of tires such as fabric tires and particularly those of the smaller sizes. Solid tires, and particularly those of large size, may require longer heating periods, depending also to some extent upon the nature of the rubber compound used. I do not wholly limit my claims to specific time periods of heating, as the heating periods may be variously modified according to the size and characteristics of the article to be vulcanized without departing from the scope of my invention.

I claim:

1. The process of curing a body of vulcanizable material which comprises causing a flow of heat from the surface toward the inner region of the body during the first part of the vulcanizing period and causing a flow of residual heat in the opposite direction during a sufficient part of the vulcanizing period to result in substantially equal vulcanization of all parts of said body.

2. The process of curing a vulcanizable article which comprises heating the surface portion of the article to a temperature substantially higher than the mean vulcanizing temperature to cause a rapid flow of heat to the inner region of said article, and subsequently reducing the vulcanizing temperature of said surface portion below the vulcanizing temperature of said inner region to lessen the rate of vulcanization in the surface portion while said inner region continues to be vulcanized by the residual heat therein at a higher rate than said surface portion.

3. The process of curing a vulcanizable article which comprises enclosing said article in a mold, applying a heating medium to said mold at a temperature substantially above mean vulcanizing temperature, reducing the temperature of said medium substantially to the mean vulcanizing temperature, and subsequently further cooling the exterior of the mold to lessen the rate of vulcanization in the surface region of the article while the inner region thereof continues to be vulcanized by the residual heat therein at a higher rate than said surface region.

4. The process of curing a vulcanizable article which comprises enclosing said article in a mold, applying steam to the surface of said mold at a temperature substantially above mean vulcanizing temperature for less than two-thirds of the vulcanizing period, then maintaining said steam at a temperature lower than that of the surface region of the mold for the rest of the vulcanizing period.

5. The process of curing a vulcanizable article which comprises causing a flow of heat from its surface to its inner region during the first part of the vulcanizing period, and causing a flow of heat in the opposite direction during more than one-fourth of the vulcanizing period.

6. The process of curing a vulcanizable hollow article which comprises applying heat to the interior and exterior surfaces of the article at temperatures substantially higher than mean vulcanizing temperature, and subsequently cooling the exterior surface of the article to a temperature less than that of the inner region of the wall of said article while maintaining vulcanization by residual heat in said region for more than one-quarter of the total vulcanizing period.

7. The process of curing a vulcanizable article which comprises enclosing the article in a mold, applying steam to the exterior of the mold at a temperature higher than mean vulcanizing temperature until the inner region of the article has reached a temperature higher than its mean vulcanizing temperature, then reducing the temperature of said steam to less than said mean temperature but holding it at a vulcanizing temperature for more than one-fourth of the total vulcanizing period.

8. The process of vulcanizing a pneumatic tire which comprises enclosing said tire in a mold, applying steam to said mold at approximately 300° F. for a period of from 55 to 75 minutes, and then maintaining the temperature of said steam between 270° and 295° F. for a period of from 25 to 45 minutes.

9. The process of curing a vulcanizable article which comprises enclosing the article in a mold, applying steam to the exterior of the mold at a temperature higher than mean vulcanizing temperature until the inner region of the article has reached a temperature higher than its mean vulcanizing temperature, then reducing the temperature of said steam to less than said mean temperature but holding it at a vulcanizing temperature for more than one-fourth of the total vulcanizing period, and then cooling the surface of said mold below 212° F. in a period of from 3 to 6 minutes.

10. The method of vulcanizing a pneumatic tire which comprises enclosing said tire in a mold, applying a heating medium to the interior of said tire at a temperature substantially above the mean vulcanizing temperature of the tire, applying a heating medium to said mold at a temperature substantially above the mean vulcanizing temperature of the tire, and then permitting the temperature of said media to fall, in such manner as to cause a flow of heat into the wall of the tire from its inner and outer surfaces during such first part of the vulcanizing period, and a flow of heat in the tire wall toward its inner and outer surfaces during such last part of the vulcanizing period, as to result in substantially equal vulcanization of all parts of the tire.

In witness whereof I have hereunto set my hand this 20 day of February, 1922.

ERNEST BLAKER.